(12) United States Patent
Jiang et al.

(10) Patent No.: US 11,144,163 B2
(45) Date of Patent: Oct. 12, 2021

(54) CAPACITANCE DETECTION METHOD OF TOUCH DISPLAY PANEL, CAPACITANCE DETECTION CIRCUIT OF TOUCH DISPLAY PANEL, AND ELECTRONIC DEVICE

(71) Applicant: SHENZHEN GOODIX TECHNOLOGY CO., LTD., Shenzhen (CN)

(72) Inventors: Hong Jiang, Shenzhen (CN); Guopao Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/000,472

(22) Filed: Aug. 24, 2020

(65) Prior Publication Data
US 2020/0387283 A1    Dec. 10, 2020

Related U.S. Application Data

(63) Continuation of application No. PCT/CN2019/082734, filed on Apr. 15, 2019.

(51) Int. Cl.
*G06F 3/041* (2006.01)
*G06F 3/044* (2006.01)
*G01D 5/241* (2006.01)

(52) U.S. Cl.
CPC ....... *G06F 3/04184* (2019.05); *G01D 5/2417* (2013.01); *G06F 3/0445* (2019.05); *G06F 3/0446* (2019.05)

(58) Field of Classification Search
CPC .. G06F 3/04184; G06F 3/0445; G06F 3/0446; G06F 3/044; G06F 3/0418; G01D 5/2417
See application file for complete search history.

(56) References Cited

U.S. PATENT DOCUMENTS

| 10,838,547 | B1* | 11/2020 | Shen | G06F 3/0412 |
| 2011/0115729 | A1 | 5/2011 | Kremin et al. | |
| 2012/0056834 | A1* | 3/2012 | Kim | G09G 3/3648 345/173 |

(Continued)

FOREIGN PATENT DOCUMENTS

| CN | 103376961 A | 10/2013 |
| CN | 109324717 A | 2/2019 |

*Primary Examiner* — Ibrahim A Khan
(74) *Attorney, Agent, or Firm* — Brion Raffoul

(57) ABSTRACT

A capacitance detection method of a touch display panel, a capacitance detection circuit, and an electronic device are provided. The method includes: receiving a real-time sync signal sent from a display panel, and generating a trigger signal in a period in which a display driving noise is avoided based on the real-time sync signal (S1); generating a sync driving signal in the period in which the display driving noise is avoided based on the received trigger signal, to drive a driving electrode of the touch display panel (S2); and detecting a signal value of a capacitance sensor in the touch display panel in the period in which the display driving noise is avoided based on the received trigger signal (S3). This method is little affected by the display driving operation, and improves the signal-to-noise ratio (SNR) of a finally detected effective signal, thus greatly improving the touch sensitivity.

17 Claims, 5 Drawing Sheets

(56) References Cited

U.S. PATENT DOCUMENTS

| | | | |
|---|---|---|---|
| 2014/0092061 A1* | 4/2014 | Akai | G06F 3/04182 |
| | | | 345/174 |
| 2015/0022476 A1* | 1/2015 | Fujioka | G09G 3/3648 |
| | | | 345/173 |
| 2016/0231859 A1* | 8/2016 | Chen | G06F 3/04184 |
| 2017/0131823 A1* | 5/2017 | Dinu | G06F 3/044 |
| 2018/0059870 A1* | 3/2018 | Krah | G06F 3/044 |
| 2019/0064962 A1* | 2/2019 | Bye | G06F 3/041662 |
| 2019/0102034 A1* | 4/2019 | Nam | G06F 3/03545 |

* cited by examiner

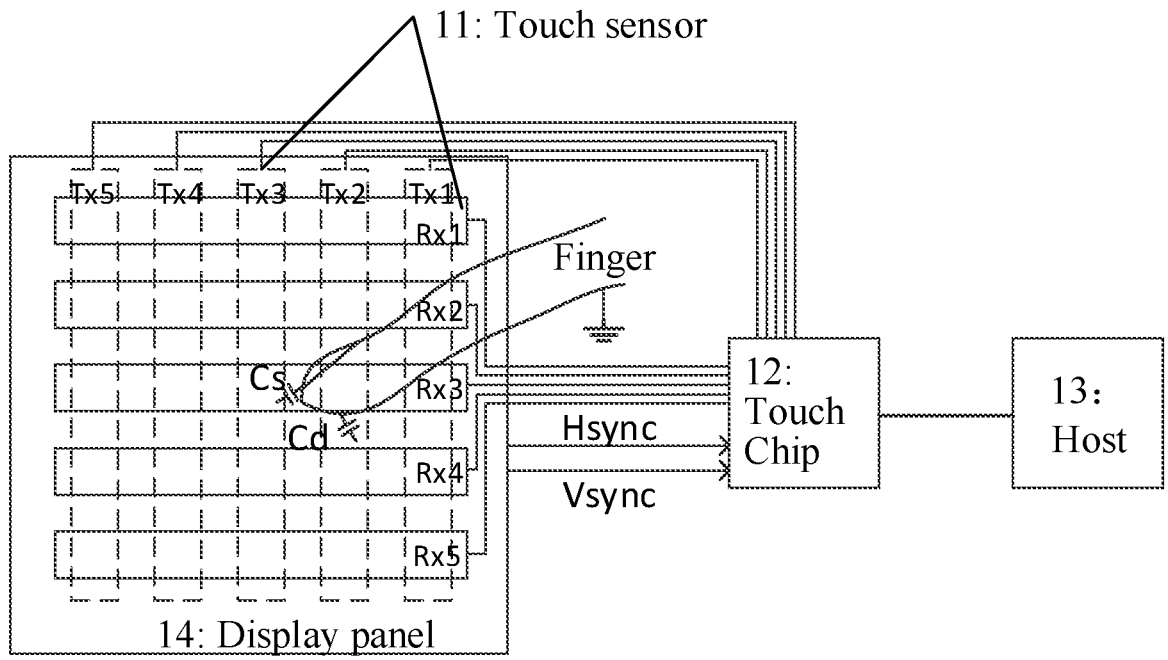

FIG. 1

| Receiving a real-time sync signal sent from a display panel, and generating a trigger signal in a period in which a display driving noise is avoided based on the real-time sync signal | S1 |

| Generating a sync driving signal in the period in which the display driving noise is avoided based on the received trigger signal, to drive a driving electrode of the touch display panel | S2 |

| Detecting a signal value of a capacitance sensor in the touch display panel in the period in which the display driving noise is avoided based on the received trigger signal | S3 |

FIG. 2

CAPACITANCE DETECTION METHOD OF TOUCH DISPLAY PANEL, CAPACITANCE DETECTION CIRCUIT OF TOUCH DISPLAY PANEL, AND ELECTRONIC DEVICE

CROSS-REFERENCE TO RELATED APPLICATION

This application is a continuation of International Application No. PCT/CN2019/082734, filed on Apr. 15, 2019, the application of which is hereby incorporated by reference in its entirety.

TECHNICAL FIELD

Embodiments of the present disclosure relate to the field of touch control technologies, and in particular to, a capacitance detection method of a touch display panel, a capacitance detection circuit of a touch display panel, and a touch display panel.

BACKGROUND

Interference from driving a displayer will generally cause interference to a sensing wire of a capacitance sensor, and the caused interference will vary with displayed patterns. Sometimes, the interference will be very large. A current capacitance detection scheme has the problem of low touch sensitivity when faced with strong interference from driving the displayer. While the touch sensitivity may be optimized using a frequency-hopping detection mechanism, the interference from driving the displayer always fails to be avoided. When the interference from driving the displayer is large, displayer interference noise may be very large on a full-band spectrum within a system bandwidth, such that finally the touch sensitivity is not improved significantly.

SUMMARY

In view of this, one of the technical problems solved by embodiments of the present disclosure is to provide a capacitance detection method of a touch display panel, a capacitance detection circuit of a touch display panel, and a touch display panel, to overcome or alleviate the above defects in the prior art.

An embodiment of the present disclosure provides a capacitance detection method of a touch display panel, including: receiving a real-time sync signal sent from a display panel, and generating a trigger signal in a period in which a display driving noise is avoided based on the real-time sync signal; generating a sync driving signal in the period in which the display driving noise is avoided based on the received trigger signal, to drive a driving electrode of the touch display panel; and detecting a signal value of a capacitance sensor in the touch display panel in the period in which the display driving noise is avoided based on the received trigger signal.

An embodiment of the present disclosure provides a capacitance detection circuit of a touch display panel, including: a sync signal controller configured to receive a real-time sync signal sent from a display panel, and generate a trigger signal in a period in which a display driving noise is avoided based on the real-time sync signal; a driving signal generator configured to generate a sync driving signal in the period in which the display driving noise is avoided based on the received trigger signal, to drive a driving electrode of the touch display panel; and a signal detection gate configured to detect a signal value of a capacitance sensor in the touch display panel in the period in which the display driving noise is avoided based on the received trigger signal.

An embodiment of the present disclosure provides a touch chip, including: the capacitance detection circuit in any one embodiment of the present disclosure.

An embodiment of the present disclosure provides an electronic device, including the capacitance detection circuit in any one embodiment of the present disclosure.

The technical solutions provided by the embodiments of the present disclosure generate a trigger signal in a period in which a display driving noise is avoided based on a received real-time sync signal, generate a sync driving signal in the period in which the display driving noise is avoided based on the received trigger signal, to drive a driving electrode of the touch display panel, and detect a signal value of a capacitance sensor in the touch display panel in the period in which the display driving noise is avoided based on the received trigger signal. Therefore, the embodiments of the present disclosure perform driving and signal detection on a touch sensor in a period in which a display driving noise is avoided, such that its sensing wire can not only detect a large effective signal amount, but also be little affected by a display driving operation of a displayer, thereby improving the signal-to-noise ratio (SNR) of a finally detected effective signal, and greatly improving the touch sensitivity.

BRIEF DESCRIPTION OF THE DRAWINGS

Some specific embodiments of embodiments of the present disclosure will be described in detail below with reference to the accompanying drawings, in an example manner, instead of a non-limiting manner. Identical reference numerals in the accompanying drawings represent identical or similar components or parts. As will be appreciated by those skilled in the art, these accompanying drawings may not be drawn to scale. In the figures:

FIG. 1 is a schematic structural diagram of a touch display panel in an embodiment of the present disclosure;

FIG. 2 is a flowchart of a capacitance detection method of a touch display panel in an embodiment of the present disclosure;

DETAILED DESCRIPTION OF EMBODIMENTS

Any technical solution of embodiments of the present disclosure may not necessarily be implemented to achieve all of the above advantages.

Referring to FIG. 1, the touch display panel includes a touch sensor 11, a touch chip 12, a host 13, and a display panel 14. The touch sensor 11 has a two-layer structure. Here, a driving layer thereof is called Tx, a sensing layer thereof is called Rx, and a display panel 14 is below the driving layer Tx and the sensing layer Rx. Interference from driving the display panel 14 will affect a sensing precision of the driving layer Tx and the sensing layer Rx. Especially for Y-OCTA technology, the touch sensor 11 and the display panel 14 are made together, to become a touch display panel. Therefore, in the touch display panel using the Y-OCTA technology, the display panel 14 is closer to the driving layer Tx and the sensing layer Rx, and the impact on the sensing precision of the driving layer Tx and the sensing layer Rx caused by the display panel 14 is also greatly increased, resulting in a significant decrease of the touch sensitivity.

The technical solutions provided by the embodiments of the present disclosure generate a trigger signal in a period in which a display driving noise is avoided based on a received real-time sync signal, generate a sync driving signal in the period in which the display driving noise is avoided based on the received trigger signal, to drive a driving electrode of the touch display panel, and detect a signal value of a capacitance sensor in the touch display panel in the period in which the display driving noise is avoided based on the received trigger signal. Therefore, the embodiments of the present disclosure perform driving and signal detection on a touch sensor in a period in which a display driving noise is avoided, such that its sensing wire can not only detect a large effective signal amount, but also be little affected by a display driving operation of a displayer, thereby improving the signal-to-noise ratio (SNR) of a finally detected effective signal, and greatly improving the touch sensitivity.

Specific implementations of the embodiments of the present disclosure will be further illustrated below in conjunction with the accompanying drawings of the embodiments of the present disclosure.

FIG. 2 is a flowchart of a capacitance detection method of a touch display panel in an embodiment of the present disclosure.

The method includes:

S1: receiving a real-time sync signal sent from a display panel, and generating a trigger signal in a period in which a display driving noise is avoided based on the real-time sync signal.

Figure 3A:
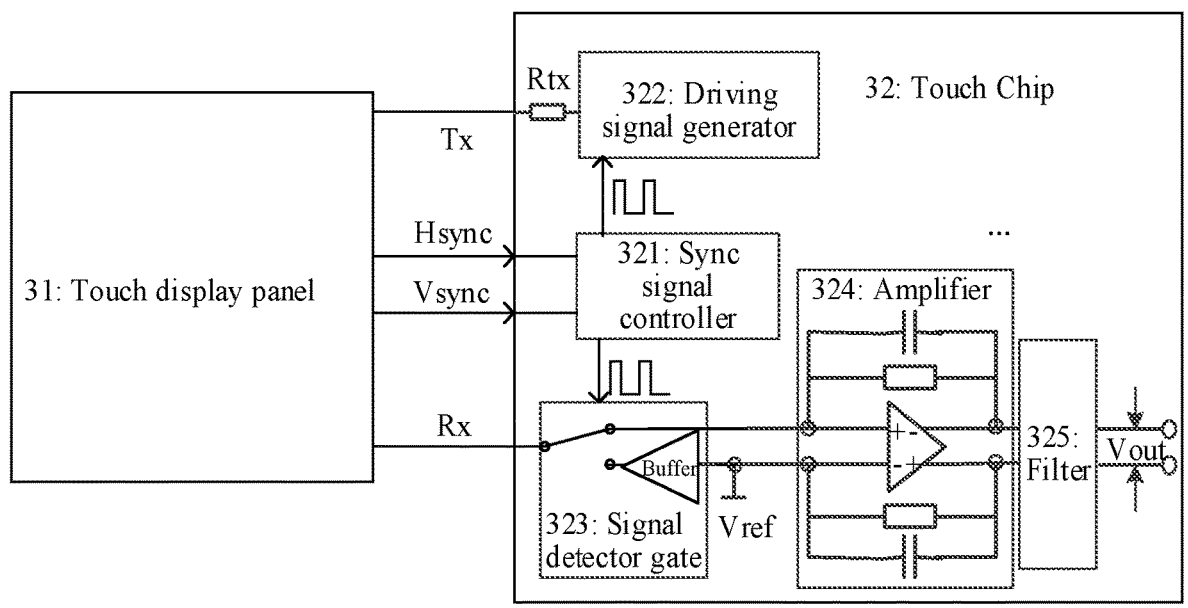
FIG. 3a is a circuit diagram of a capacitance detection circuit of a touch display panel in an embodiment of the present disclosure.
Figure 3B:
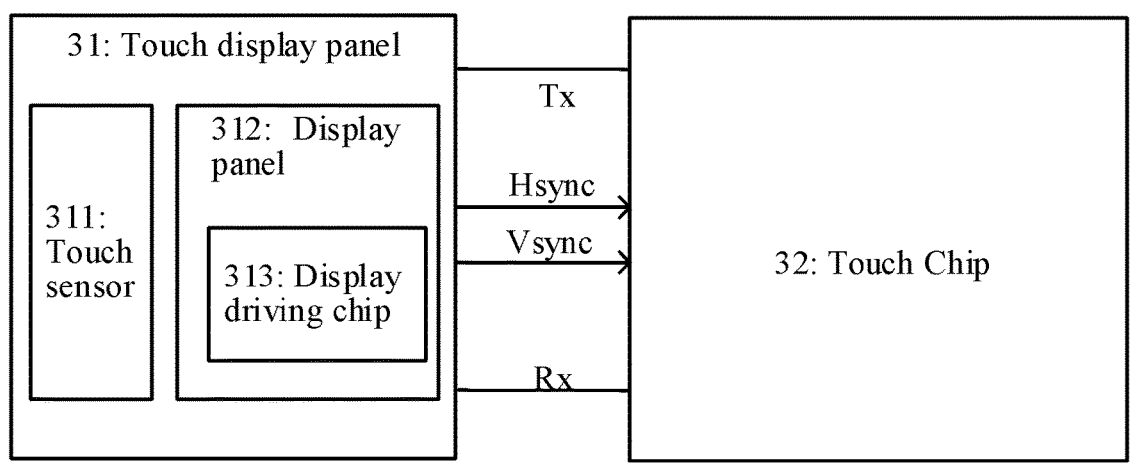
FIG. 3b is a schematic structural diagram of a touch display panel in an embodiment of the present disclosure.

Referring to FIG. 3a and FIG. 3b, the touch display panel 31 according to the embodiment of the present disclosure includes a touch sensor 311, a display panel 312, and a display driving chip 313. The display driving chip 313 sends the real-time sync signal, the touch sensor 311 is coupled to the driving layer Tx and the sensing layer Rx, the display driving chip 313 is coupled to the display panel 312, and the display panel 312 is coupled to the touch sensor 311. The touch chip 32 includes a sync signal controller 321, a driving signal generator 322, and a signal detection gate 323. The sync signal controller 321 receives the real-time sync signal sent from the display panel in the touch display panel 31, and generates the trigger signal in the period in which the display driving noise is avoided. The trigger signal can perform a triggering operation on a system operation in the period in which the display driving noise is avoided.

Figure 4:
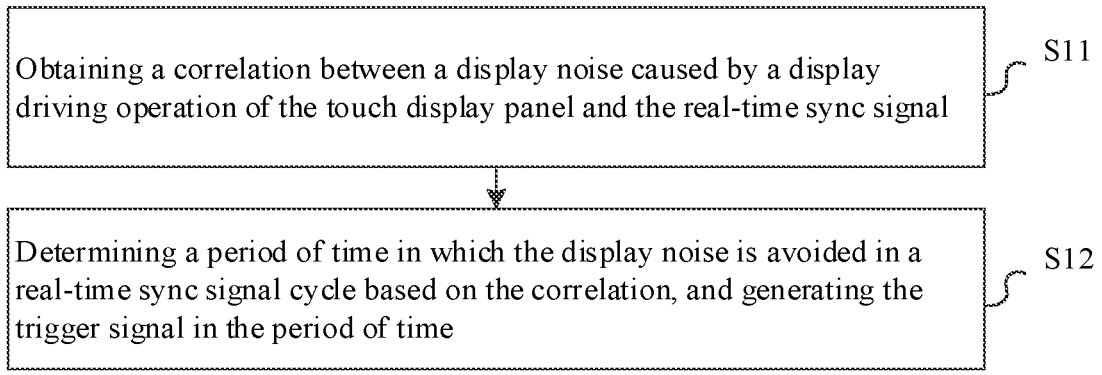
FIG. 4 is a flowchart of step S1 in the capacitance detection method of a touch display panel in an embodiment of the present disclosure.

In a specific implementation of the present disclosure, referring to FIG. 4, the step S1 includes:

S11: obtaining a correlation between a display noise caused by a display driving operation of the touch display panel and the real-time sync signal.

The real-time sync signal generally includes: a real-time horizontal sync signal (Hsync) having the correlation with the display noise and a real-time vertical sync signal (Vsync) controlling a refresh rate.

Specifically, the real-time sync signal according to the present disclosure means the real-time horizontal sync signal (Hsync). The present disclosure determines a trigger time point of the trigger signal based on a relationship between the display noise caused by the display driving operation and the real-time horizontal sync signal (Hsync).

Figure 5:
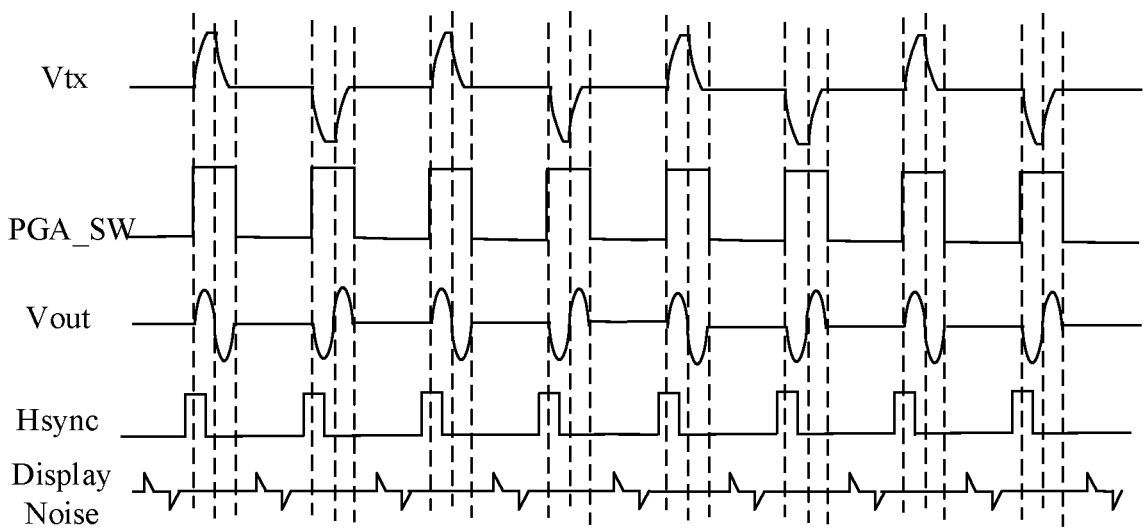
FIG. 5 is a schematic sequence diagram reflecting an association relationship of signals in an embodiment of the present disclosure.

Referring to FIG. 5, in the touch display panel, when a display data signal changes, a noise caused by the display driving operation will occur, as shown in a display noise waveform. A time domain distribution of the display noise waveform is strongly correlated with the real-time horizontal sync signal (Hsync). The correlation includes the display noise being fixed and centralized with respect to an edge position of the real-time horizontal sync signal (Hsync). Therefore, there is still a period of time in which the display noise is small in each of the real-time horizontal sync signal (Hsync) cycle.

However, the correlation is not only limited to the display noise being fixed and centralized with respect to the edge position of the real-time horizontal sync signal (Hsync), but also includes other correlation of the display noise with respect to the real-time horizontal sync signal (Hsync). For example, the display noise is fixed and centralized with respect to a segment of waveform of the real-time horizontal sync signal (Hsync), and for another example, the display noise has a similar waveform with respect to the segment of waveform of the real-time horizontal sync signal (Hsync). This is not limited in the present disclosure.

S12: determining a period of time in which the display noise is avoided in a real-time sync signal cycle based on the correlation, and generating the trigger signal in the period of time.

The present disclosure triggers generation of the sync driving signal and detection of the signal value of the capacitance sensor using the period of time in which the display noise is avoided in the real-time sync signal cycle, such that the trigger signal generates the triggering operation in the period of time in which the display noise is avoided in the real-time horizontal sync signal (Hsync) cycle.

S2: generating a sync driving signal in the period in which the display driving noise is avoided based on the received trigger signal, to drive a driving electrode of the touch display panel.

Due to the correlation between the real-time horizontal sync signal (Hsync) and the display noise, the trigger signal is generated in a period of time in which the real-time horizontal sync signal (Hsync) avoids the display noise based on the correlation, so as to generate the sync driving signal in the period in which the display driving noise is avoided based on the trigger signal.

Specifically, referring to FIG. 3a, under the control of the trigger signal, the driving signal generator 322 according to the embodiment of the present disclosure triggers generation of a sync driving signal Vtx in the period in which the display driving noise is avoided, and adjusts a duty ratio of the sync driving signal Vtx, such that the sync driving signal Vtx avoids a period of the display driving noise.

The driving signal generator 322 is configured to generate the sync driving signal Vtx based on the trigger signal, such that the sync driving signal Vtx is an approximately square waveform with a high level, a zero level, and a low level, as shown in FIG. 5.

Referring to FIG. 5, the sync driving signal Vtx is triggered by the trigger signal to generate a high-low level waveform in a period of time after a high level of the horizontal sync signal (Hsync) is delayed, while adjusting the duty ratio of the sync driving signal Vtx, such that the high level (peak interval) and the low level (valley interval) of the sync driving signal Vtx avoid the display noise caused by the display driving operation, i.e., a noise waveform of the display noise coincides with a time sequence of a zero-level interval of the sync driving signal Vtx. Therefore, the sync driving signal Vtx avoids the display noise caused by the display driving operation and will not be affected by the display noise caused by the display driving operation. Since the sync driving signal Vtx is the high-low level waveform generated due to trigger by the trigger signal associated with the horizontal sync signal (Hsync), a frequency of the horizontal sync signal (Hsync) is an integral multiple of a frequency of the sync driving signal Vtx. The frequency of the horizontal sync signal (Hsync) in FIG. 5 is twice the frequency of the sync driving signal Vtx.

The driving signal generator 322 sends the sync driving signal Vtx to the touch display panel to drive a driving electrode Tx of the touch display panel.

S3: detecting a signal value of a capacitance sensor in the touch display panel in the period in which the display driving noise is avoided based on the received trigger signal.

Referring to FIG. 3a, the signal detection gate 323 according to an embodiment of the present disclosure, under the control of the trigger signal, detects the signal value of the capacitance sensor in the period in which the display driving noise is avoided, while does not detect the signal value of the capacitance sensor during the period of the display driving noise.

Specifically, an embodiment of the present disclosure uses a gating signal PGA_SW to control whether to detect the signal value of the capacitance sensor.

Referring to FIG. 5, the gating signal PGA_SW is triggered by the trigger signal to generate the high-low level waveform in the period of time after the high level of the horizontal sync signal (Hsync) is delayed, and the display noise caused by the display driving operation is avoided during a period of the high level of the horizontal sync signal (Hsync), such that detection of the capacitance signal of the capacitance sensor avoids the display noise caused by the display driving operation, and will not be affected by the display noise caused by the display driving operation.

The driving electrode Tx in the touch display panel 31 is driven by the sync driving signal Vtx. A change of a coupling capacitance of the driving electrode Tx and the sensing electrode Rx in the touch display panel 31 caused by a user touch is the signal value of the capacitance sensor in the touch display panel. The signal value of the capacitance sensor in the touch display panel is gated by the signal detection gate 323 in the touch chip 32 for detection to obtain a waveform portion of an output signal Vout. Therefore, position coordinates of the user touch in the touch display panel 31 are obtained based on the output signal Vout.

The embodiment of the present disclosure, triggered by the trigger signal, can detect the signal value of the capacitance sensor only in the period in which the display driving noise is avoided, such that the detected signal value of the capacitance sensor is not affected by the display noise caused by the display driving operation.

Referring to FIG. 3a, the signal detection gate 323 of the present disclosure gatedly connects the signal value of the capacitance sensor to a VrefBuffer storing a reference voltage Vref during the period of the display driving noise, the VrefBuffer is connected to an input terminal of a differential circuit, and a reference voltage Vref is inputted to another input terminal of the differential circuit. Thus, an output terminal of the differential circuit is at a zero level, thereby achieving the output signal Vout being at the zero level during the period of the display driving noise.

In this embodiment, a trigger signal is generated in a period in which a display driving noise is avoided based on a received real-time sync signal, a sync driving signal is generated in the period in which the display driving noise is avoided based on the received trigger signal, to drive a driving electrode of the touch display panel, and a signal value of a capacitance sensor in the touch display panel is detected in the period in which the display driving noise is avoided based on the received trigger signal. Therefore, the embodiments of the present disclosure perform driving and signal detection on a touch sensor in a period in which a display driving noise is avoided, such that its sensing wire can not only detect a large effective signal amount, but also be little affected by a display driving operation of a displayer, thereby improving the signal-to-noise ratio (SNR) of a finally detected effective signal, and greatly improving the touch sensitivity.

Figure 6:
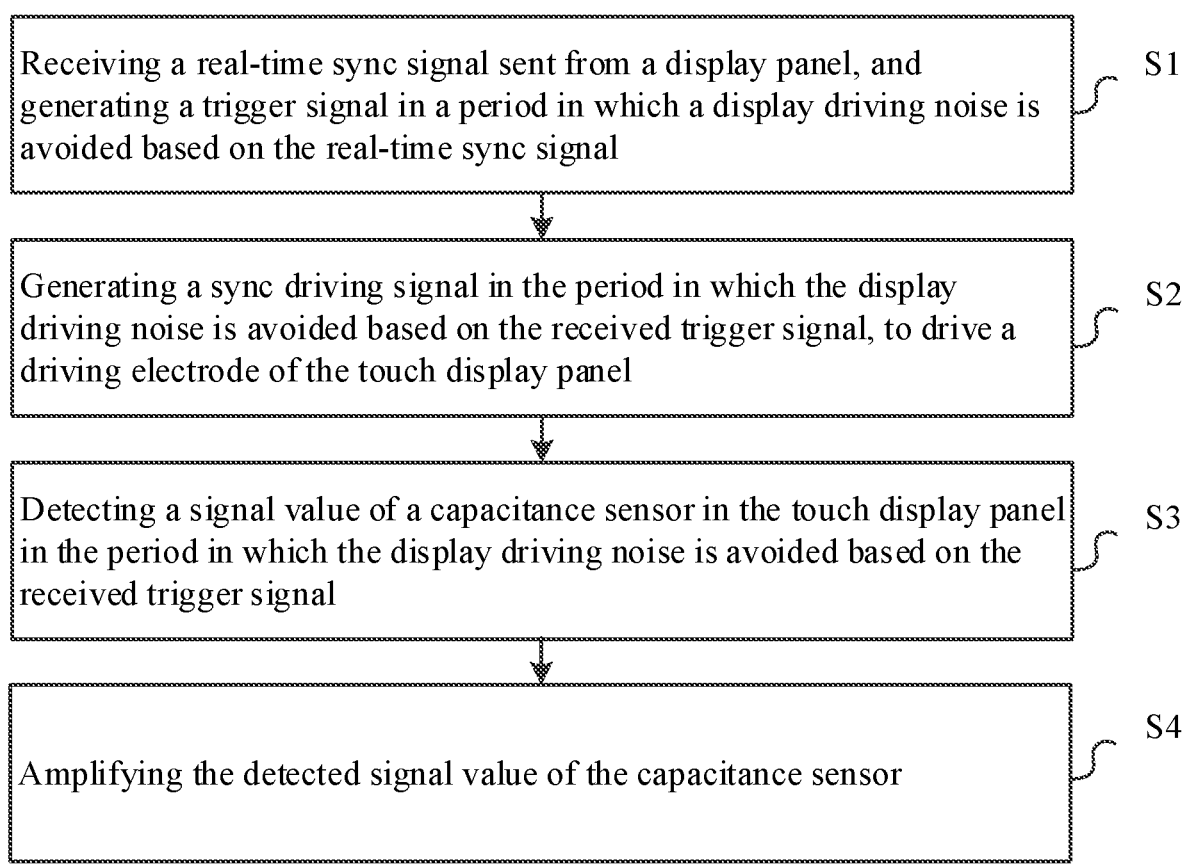
FIG. 6 is a flowchart of the capacitance detection method of a touch display panel in another embodiment of the present disclosure.

In another specific embodiment of the present disclosure, referring to FIG. 6, the method further includes:

S4: amplifying the detected signal value of the capacitance sensor.

Generally, the obtained signal value of the capacitance sensor is amplified using a programmable gain amplifier (PGA), which has a simple circuit design and is inexpensive.

Specifically, referring to FIG. 3a and FIG. 3b, the programmable gain amplifier PGA receives the signal value of the capacitance sensor gated by the gating signal PGA_SW, and the programmable gain amplifier PGA amplifies the obtained signal value of the capacitance sensor.

Of course, the present disclosure can also achieve amplifying the obtained signal value of the capacitance sensor using other amplifiers. This is not limited in the present disclosure.

Figure 7:
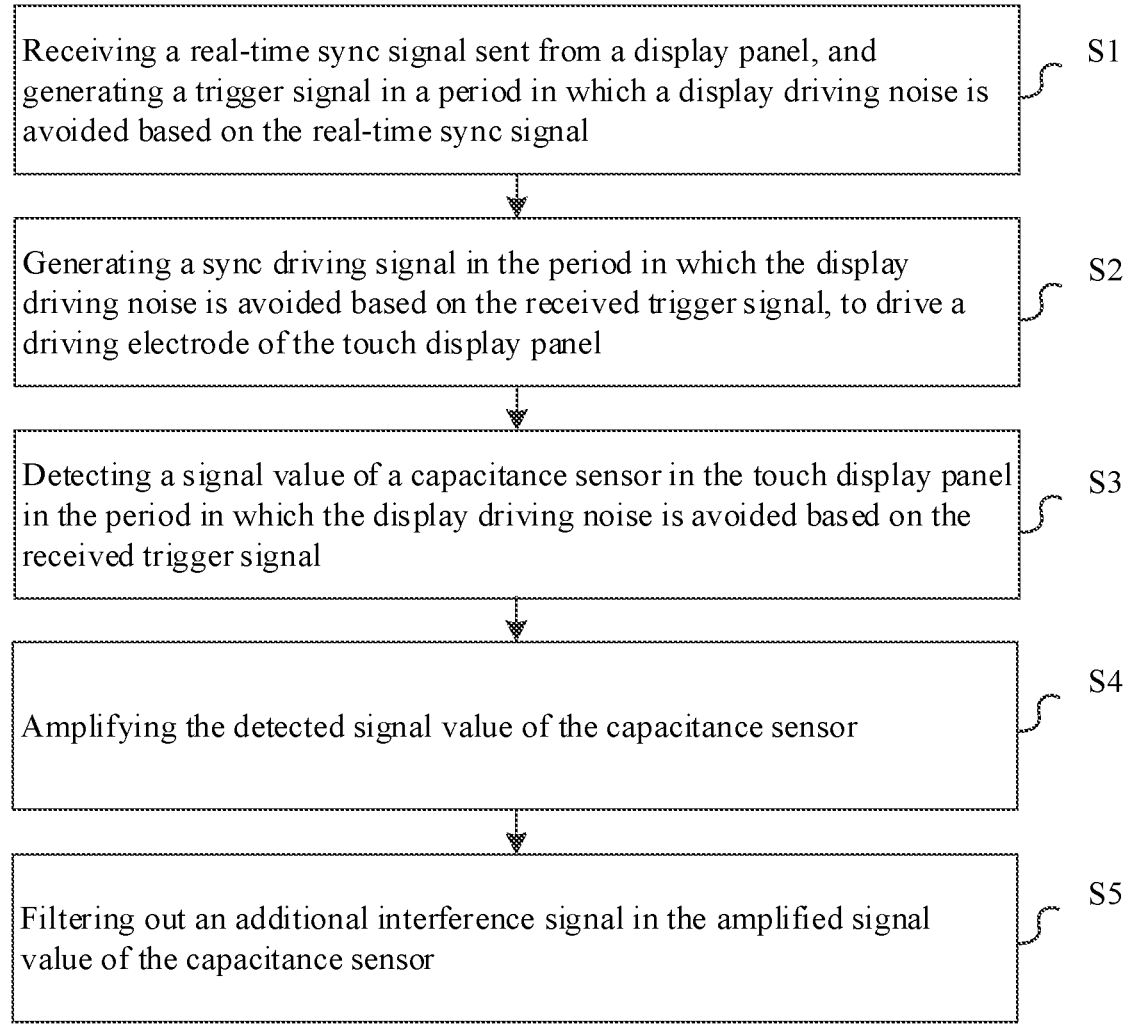
FIG. 7 is a flowchart of the capacitance detection method of a touch display panel in still another embodiment of the present disclosure.

In another specific embodiment of the present disclosure, referring to FIG. 7, the method further includes:

S5: filtering out an additional interference signal in the amplified signal value of the capacitance sensor.

Generally, a low-pass anti-aliasing filter circuit AAF is used to filter out the additional interference signal in the amplified signal value of the capacitance sensor, has a simple circuit design, and is inexpensive.

Specifically, referring to FIG. 3a, the low-pass anti-aliasing filter circuit AAF filters out the additional interference signal in the amplified signal value of the capacitance sensor.

Of course, the present disclosure can also achieve filtering the obtained signal value of the capacitance sensor using other filters. This is not limited in the present disclosure.

Referring to FIG. 3a and FIG. 3b, the touch display panel 31 according to the embodiment of the present disclosure includes a touch sensor 311, a display panel 312, and a display driving chip 313. The display driving chip 313 sends the real-time sync signal, the touch sensor 311 is coupled to the driving layer Tx and the sensing layer Rx, the display driving chip 313 is coupled to the display panel 312, and the display panel 312 is coupled to the touch sensor 311.

The capacitance detection circuit is located in the touch chip 32, and the touch chip 32 is connected to the touch display panel 31. The touch display panel includes the touch sensor, the touch chip 32, the host, and the display panel.

The touch sensor has a two-layer structure. Here, a driving layer thereof is called Tx, a sensing layer thereof is called Rx, and a display panel is below the driving layer Tx and the sensing layer Rx.

The circuit includes:

the sync signal controller 321 configured to receive a real-time sync signal sent from a display panel, and generate a trigger signal in a period in which a display driving noise is avoided based on the real-time sync signal;

the driving signal generator 322 configured to generate a sync driving signal in the period in which the display driving noise is avoided based on the received trigger signal, to drive a driving electrode of the touch display panel; and the signal detection gate 323 configured to detect a signal value of a capacitance sensor in the touch display panel in the period in which the display driving noise is avoided based on the received trigger signal.

The sync signal controller 321 receives the real-time sync signal sent from the display panel in the touch display panel 31, and generates the trigger signal in the period in which the display driving noise is avoided. The trigger signal can perform a triggering operation on a system operation in the period in which the display driving noise is avoided.

Figure 8:
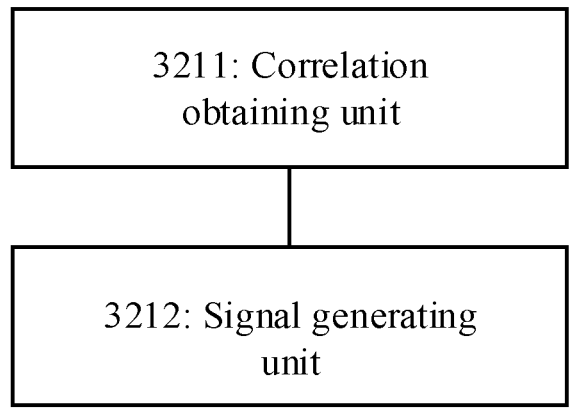
FIG. 8 is a schematic structural diagram of a sync signal controller of the capacitance detection circuit of a touch display panel in yet another embodiment.

In a specific implementation of the present disclosure, referring to FIG. 8, the sync signal controller 321 includes:

a correlation obtaining unit 3211 configured to obtain a correlation between a display noise caused by a display driving operation of the touch display panel and the real-time sync signal; and a signal generating unit 3212 configured to determine a period of time in which the display noise is avoided in a real-time sync signal cycle based on the correlation, and generate the trigger signal in the period of time.

The real-time sync signal generally includes: a real-time horizontal sync signal (Hsync) having the correlation with the display noise and a real-time vertical sync signal (Vsync) controlling a refresh rate.

Specifically, the real-time sync signal according to the present disclosure means the real-time horizontal sync signal (Hsync). The present disclosure determines a trigger time point of the trigger signal based on a relationship between the display noise caused by the display driving operation and the real-time horizontal sync signal (Hsync).

Referring to FIG. 5, in the touch display panel, when a display data signal changes, a noise caused by the display driving operation will occur, as shown in a display noise waveform. A time domain distribution of the display noise waveform is strongly correlated with the real-time horizontal sync signal (Hsync). The correlation includes the display noise being fixed and centralized with respect to an edge position of the real-time horizontal sync signal (Hsync). Therefore, there is still a period of time in which the display noise is small in each of the real-time horizontal sync signal (Hsync) cycle.

However, the correlation is not only limited to the display noise being fixed and centralized with respect to the edge position of the real-time horizontal sync signal (Hsync), but also includes other correlation of the display noise with respect to the real-time horizontal sync signal (Hsync). For example, the display noise is fixed and centralized with respect to a segment of waveform of the real-time horizontal sync signal (Hsync), and for another example, the display noise has a similar waveform with respect to the segment of waveform of the real-time horizontal sync signal (Hsync). This is not limited in the present disclosure.

The present disclosure triggers generation of the sync driving signal and detection of the signal value of the capacitance sensor using the period of time in which the display noise is avoided in the real-time sync signal cycle, such that the trigger signal generates the triggering operation in the period of time in which the display noise is avoided in the real-time horizontal sync signal (Hsync) cycle.

Due to the correlation between the real-time horizontal sync signal (Hsync) and the display noise, the trigger signal is generated in a period of time in which the real-time horizontal sync signal (Hsync) avoids the display noise based on the correlation, so as to generate the sync driving signal in the period in which the display driving noise is avoided based on the trigger signal.

Specifically, referring to FIG. 3a, under the control of the trigger signal, the driving signal generator 322 according to the embodiment of the present disclosure triggers generation of a sync driving signal Vtx in the period in which the display driving noise is avoided, and adjusts a duty ratio of the sync driving signal Vtx, such that the sync driving signal Vtx avoids a period of the display driving noise.

The driving signal generator 322 is configured to generate the sync driving signal Vtx based on the trigger signal, such that the sync driving signal Vtx is an approximately square waveform with a high level, a zero level, and a low level, as shown in FIG. 5.

Referring to FIG. 5, the sync driving signal Vtx is triggered by the trigger signal to generate a high-low level waveform in a period of time after a high level of the horizontal sync signal (Hsync) is delayed, while adjusting the duty ratio of the sync driving signal Vtx, such that the high level (peak interval) and the low level (valley interval) of the sync driving signal Vtx avoid the display noise caused by the display driving operation, i.e., a noise waveform of the display noise coincides with a time sequence of a zero-level interval of the sync driving signal Vtx. Therefore, the sync driving signal Vtx avoids the display noise caused by the display driving operation and will not be affected by the display noise caused by the display driving operation. Since the sync driving signal Vtx is the high-low level waveform generated due to trigger by the trigger signal associated with the horizontal sync signal (Hsync), a frequency of the horizontal sync signal (Hsync) is an integral multiple of a frequency of the sync driving signal Vtx. The frequency of the horizontal sync signal (Hsync) in FIG. 5 is twice the frequency of the sync driving signal Vtx.

The driving signal generator 322 sends the sync driving signal Vtx to the touch display panel to drive a driving electrode Tx of the touch display panel.

Referring to FIG. 3a, the signal detection gate 323 according to an embodiment of the present disclosure, under the control of the trigger signal, detects the signal value of the capacitance sensor in the period in which the display driving noise is avoided, while does not detect the signal value of the capacitance sensor during the period of the display driving noise.

Specifically, an embodiment of the present disclosure uses a gating signal PGA_SW to control whether to detect the signal value of the capacitance sensor.

Referring to FIG. 5, the gating signal PGA_SW is triggered by the trigger signal to generate the high-low level waveform in the period of time after the high level of the horizontal sync signal (Hsync) is delayed, and the display noise caused by the display driving operation is avoided during a period of the high level of the horizontal sync signal (Hsync), such that detection of the capacitance signal of the capacitance sensor avoids the display noise caused by the display driving operation, and will not be affected by the display noise caused by the display driving operation.

The driving electrode Tx in the touch display panel 31 is driven by the sync driving signal Vtx. A change of a coupling capacitance of the driving electrode Tx and the sensing electrode Rx in the touch display panel 31 caused by a user touch is the signal value of the capacitance sensor in the touch display panel. The signal value of the capacitance sensor in the touch display panel is gated by the signal detection gate 323 in the touch chip 32 for detection to obtain a waveform portion of an output signal Vout. Therefore, position coordinates of the user touch in the touch display panel 31 are obtained based on the output signal Vout.

The embodiment of the present disclosure, triggered by the trigger signal, can detect the signal value of the capacitance sensor only in the period in which the display driving noise is avoided, such that the detected signal value of the capacitance sensor is not affected by the display noise caused by the display driving operation.

Referring to FIG. 3a, the signal detection gate 323 of the present disclosure gatedly connects the signal value of the capacitance sensor to a VrefBuffer storing a reference voltage Vref during the period of the display driving noise, the VrefBuffer is connected to an input terminal of a differential circuit, and a reference voltage Vref is inputted to another input terminal of the differential circuit. Thus, an output terminal of the differential circuit is at a zero level, thereby achieving the output signal Vout being at the zero level during the period of the display driving noise.

In this embodiment, a trigger signal is generated in a period in which a display driving noise is avoided based on a received real-time sync signal, a sync driving signal is generated in the period in which the display driving noise is avoided based on the received trigger signal, to drive a driving electrode of the touch display panel, and a signal value of a capacitance sensor in the touch display panel is detected in the period in which the display driving noise is avoided based on the received trigger signal. Therefore, the embodiments of the present disclosure perform driving and signal detection on a touch sensor in a period in which a display driving noise is avoided, such that its sensing wire can not only detect a large effective signal amount, but also be little affected by a display driving operation of a displayer, thereby improving the signal-to-noise ratio (SNR) of a finally detected effective signal, and greatly improving the touch sensitivity.

In another specific embodiment of the present disclosure, referring to FIG. 3a, the circuit further includes:

an amplifier 324 configured to amplify the detected signal value of the capacitance sensor.

Generally, the obtained signal value of the capacitance sensor is amplified using a programmable gain amplifier (PGA), which has a simple circuit design and is inexpensive.

Specifically, referring to FIG. 3a, the programmable gain amplifier PGA receives the signal value of the capacitance sensor gated by the gating signal PGA_SW, and the programmable gain amplifier PGA amplifies the obtained signal value of the capacitance sensor.

Of course, the present disclosure can also achieve amplifying the obtained signal value of the capacitance sensor using other amplifiers. This is not limited in the present disclosure.

In another specific embodiment of the present disclosure, referring to FIG. 3a, the circuit further includes:

a filter 325 configured to filter out an additional interference signal in the amplified signal value of the capacitance sensor.

Generally, a low-pass anti-aliasing filter circuit AAF is used to filter out the additional interference signal in the amplified signal value of the capacitance sensor, has a simple circuit design, and is inexpensive.

Specifically, referring to FIG. 3a, the low-pass anti-aliasing filter circuit AAF filters out the additional interference signal in the amplified signal value of the capacitance sensor.

Of course, the present disclosure can also achieve filtering the obtained signal value of the capacitance sensor using other filters. This is not limited in the present disclosure.

An embodiment of the present disclosure provides a touch chip, including: the capacitance detection circuit in any one embodiment of the present disclosure.

Referring to FIG. 3a, the touch chip 32 includes the capacitance detection circuit, and the touch chip 32 is connected to the touch display panel 31.

The circuit includes:

the sync signal controller 321 configured to receive a real-time sync signal sent from a display panel, and generate a trigger signal in a period in which a display driving noise is avoided based on the real-time sync signal;

the driving signal generator 322 configured to generate a sync driving signal in the period in which the display driving noise is avoided based on the received trigger signal, to drive a driving electrode of the touch display panel; and the signal detection gate 323 configured to detect a signal value of a capacitance sensor in the touch display panel in the period in which the display driving noise is avoided based on the received trigger signal.

The sync signal controller 321 receives the real-time sync signal sent from the display panel in the touch display panel 31, and generates the trigger signal in the period in which the display driving noise is avoided. The trigger signal can perform a triggering operation on a system operation in the period in which the display driving noise is avoided.

In a specific implementation of the present disclosure, referring to FIG. 8, the sync signal controller 321 includes:

a correlation obtaining unit 3211 configured to obtain a correlation between a display noise caused by a display driving operation of the touch display panel and the real-time sync signal; and a signal generating unit 3212 configured to determine a period of time in which the display noise is avoided in a real-time sync signal cycle based on the correlation, and generate the trigger signal in the period of time.

The real-time sync signal generally includes: a real-time horizontal sync signal (Hsync) having the correlation with the display noise and a real-time vertical sync signal (Vsync) controlling a refresh rate.

Specifically, the real-time sync signal according to the present disclosure means the real-time horizontal sync signal (Hsync). The present disclosure determines a trigger time point of the trigger signal based on a relationship between the display noise caused by the display driving operation and the real-time horizontal sync signal (Hsync).

Referring to FIG. 5, in the touch display panel, when a display data signal changes, a noise caused by the display driving operation will occur, as shown in a display noise waveform. A time domain distribution of the display noise waveform is strongly correlated with the real-time horizontal sync signal (Hsync). The display noise is fixed and centralized with respect to an edge position of the real-time horizontal sync signal (Hsync). Therefore, there is still a period of time in which the display noise is small in each of the real-time horizontal sync signal (Hsync) cycle.

The present disclosure triggers generation of the sync driving signal and detection of the signal value of the capacitance sensor using the period of time in which the display noise is avoided in the real-time sync signal cycle, such that the trigger signal generates the triggering operation in the period of time in which the display noise is avoided in the real-time horizontal sync signal (Hsync) cycle.

Due to the correlation between the real-time horizontal sync signal (Hsync) and the display noise, the trigger signal is generated in a period of time in which the real-time horizontal sync signal (Hsync) avoids the display noise based on the correlation, so as to generate the sync driving signal in the period in which the display driving noise is avoided based on the trigger signal.

Specifically, referring to FIG. 3a, under the control of the trigger signal, the driving signal generator 322 according to the embodiment of the present disclosure triggers generation of a sync driving signal Vtx in the period in which the display driving noise is avoided, and adjusts a duty ratio of the sync driving signal Vtx, such that the sync driving signal Vtx avoids a period of the display driving noise.

The driving signal generator 322 is configured to generate the sync driving signal Vtx based on the trigger signal, such that the sync driving signal Vtx is an approximately square waveform with a high level, a zero level, and a low level, as shown in FIG. 5.

Referring to FIG. 5, the sync driving signal Vtx is triggered by the trigger signal to generate a high-low level waveform in a period of time after a high level of the horizontal sync signal (Hsync) is delayed, while adjusting the duty ratio of the sync driving signal Vtx, such that the high level (peak interval) and the low level (valley interval) of the sync driving signal Vtx avoid the display noise caused by the display driving operation, i.e., a noise waveform of the display noise coincides with a time sequence of a zero-level interval of the sync driving signal Vtx. Therefore, the sync driving signal Vtx avoids the display noise caused by the display driving operation and will not be affected by the display noise caused by the display driving operation. Since the sync driving signal Vtx is the high-low level waveform generated due to trigger by the trigger signal associated with the horizontal sync signal (Hsync), a frequency of the horizontal sync signal (Hsync) is an integral multiple of a frequency of the sync driving signal Vtx. The frequency of the horizontal sync signal (Hsync) in FIG. 5 is twice the frequency of the sync driving signal Vtx.

The driving signal generator 322 sends the sync driving signal Vtx to the touch display panel to drive a driving electrode Tx of the touch display panel.

Referring to FIG. 3a, the signal detection gate 323 according to an embodiment of the present disclosure, under the control of the trigger signal, detects the signal value of the capacitance sensor in the period in which the display driving noise is avoided, while does not detect the signal value of the capacitance sensor during the period of the display driving noise.

Specifically, an embodiment of the present disclosure uses a gating signal PGA_SW to control whether to detect the signal value of the capacitance sensor.

Referring to FIG. 5, the gating signal PGA_SW is triggered by the trigger signal to generate the high-low level waveform in the period of time after the high level of the horizontal sync signal (Hsync) is delayed, and the display noise caused by the display driving operation is avoided during a period of the high level of the horizontal sync signal (Hsync), such that detection of the capacitance signal of the capacitance sensor avoids the display noise caused by the display driving operation, and will not be affected by the display noise caused by the display driving operation.

The driving electrode Tx in the touch display panel 31 is driven by the sync driving signal Vtx. A change of a coupling capacitance of the driving electrode Tx and the sensing electrode Rx in the touch display panel 31 caused by a user touch is the signal value of the capacitance sensor in the touch display panel. The signal value of the capacitance sensor in the touch display panel is gated by the signal detection gate 323 in the touch chip 32 for detection to obtain a waveform portion of an output signal Vout. Therefore, position coordinates of the user touch in the touch display panel 31 are obtained based on the output signal Vout.

The embodiment of the present disclosure, triggered by the trigger signal, can detect the signal value of the capacitance sensor only in the period in which the display driving noise is avoided, such that the detected signal value of the capacitance sensor is not affected by the display noise caused by the display driving operation.

Referring to FIG. 3a, the signal detection gate 323 of the present disclosure gatedly connects the signal value of the capacitance sensor to a VrefBuffer storing a reference voltage during the period of the display driving noise, the VrefBuffer is connected to an input terminal of a differential circuit, and a Vref is inputted to another input terminal of the differential circuit. Thus, an output terminal of the differential circuit is at a zero level, thereby achieving the output signal Vout being at the zero level during the period of the display driving noise.

In this embodiment, a trigger signal is generated in a period in which a display driving noise is avoided based on a received real-time sync signal, a sync driving signal is generated in the period in which the display driving noise is avoided based on the received trigger signal, to drive a driving electrode of the touch display panel, and a signal value of a capacitance sensor in the touch display panel is detected in the period in which the display driving noise is avoided based on the received trigger signal. Therefore, the embodiments of the present disclosure perform driving and signal detection on a touch sensor in a period in which a display driving noise is avoided, such that its sensing wire can not only detect a large effective signal amount, but also be little affected by a display driving operation of a displayer, thereby improving the signal-to-noise ratio (SNR) of a finally detected effective signal, and greatly improving the touch sensitivity.

In another specific embodiment of the present disclosure, referring to FIG. 3a, the circuit further includes:

an amplifier 324 configured to amplify the detected signal value of the capacitance sensor.

Generally, the obtained signal value of the capacitance sensor is amplified using a programmable gain amplifier (PGA), which has a simple circuit design and is inexpensive.

Specifically, referring to FIG. 3a, the programmable gain amplifier PGA receives the signal value of the capacitance sensor gated by the gating signal PGA_SW, and the programmable gain amplifier PGA amplifies the obtained signal value of the capacitance sensor.

Of course, the present disclosure can also achieve amplifying the obtained signal value of the capacitance sensor using other amplifiers. This is not limited in the present disclosure.

In another specific embodiment of the present disclosure, referring to FIG. 3a, the circuit further includes:

a filter 325 configured to filter out an additional interference signal in the amplified signal value of the capacitance sensor.

Generally, a low-pass anti-aliasing filter circuit AAF is used to filter out the additional interference signal in the amplified signal value of the capacitance sensor, has a simple circuit design, and is inexpensive.

Specifically, referring to FIG. 3*a*, the low-pass anti-aliasing filter circuit AAF filters out the additional interference signal in the amplified signal value of the capacitance sensor.

Of course, the present disclosure can also achieve filtering the obtained signal value of the capacitance sensor using other filters. This is not limited in the present disclosure.

An embodiment of the present disclosure further provides an electronic device, including the capacitance detection circuit in any one embodiment of the present disclosure.

The electronic device in the embodiment of the present disclosure exists in various forms, including but not limited to:

(1) a mobile communication device: Such a device is characterized by having mobile communication functions, and is mainly intended to provide voice and data communication. Such a terminal includes: a smart phone (e.g., an iPhone), a multimedia phone, a functional phone, a low-end phone, and the like.

(2) an ultra-mobile personal computer device: Such a device belongs to a category of personal computers, has computing and processing functions, and generally also has the characteristics of mobile Internet access. Such a terminal includes: a device, such as a PDA, a MID, and a UMPC, e.g., an iPad.

(3) a portable entertainment device: Such a device can display and play multimedia contents. Such a device includes: an audio player, a video player (e.g., an iPod), a handheld game player, an e-book, a smart toy, and a portable vehicle navigation device.

(4) a server: a device providing a computing service. The server components include a processor 810, a hard disk, an internal memory, a system bus, and the like. A structure of the server is similar to that of a general computer. But because of the need of providing a highly reliable service, the requirements in respect of the processing capacity, stability, reliability, security, scalability, manageability, and the like are very high.

(5) other electronic apparatuses having data interaction functions.

So far, specific embodiments of the present subject matter have been described. Other embodiments fall within the scope of the appended claims. In some cases, actions disclosed in the appended claims may be performed in different orders and can still achieve the desired results. In addition, the processes depicted in the figures do not necessarily require the shown particular order or sequential order, to achieve desired results. In some embodiments, multitasking and parallel processing may be advantageous.

In the 1990s, whether an improvement of a technology is the improvement of hardware (e.g., the improvement of a circuit structure of a diode, a transistor, a switch, or the like) or the improvement of software (the improvement of a method and process) can be clearly distinguished. However, with the development of the technology, at present, an improvement of many methods and processes can be regarded as a direct improvement of a hardware circuit structure. Almost all designers get a corresponding hardware circuit structure by programming the improved method and process into a hardware circuit. Therefore, it cannot be said that the improvement of a method and process cannot be implemented by a physical hardware module. For example, a programmable logic device (PLD) (e.g., a field programmable gate array (FPGA)) is such an integrated circuit that its logic function is determined by a user through programming the device. A designer compiles a program by himself to "integrate" a digital system on a PLD without having to ask a chip manufacturer to design and make a dedicated integrated circuit chip. Furthermore, nowadays, instead of manually making integrated circuit chips, this programming is also mostly implemented with "logic compiler" software, which is similar to a software compiler used in program development and compilation, while previous original code must also be compiled using a specific programming language, which is referred to as a hardware description language (HDL). HDL includes not only one language, but also many languages, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are most commonly used languages. Those skilled in the art should also clearly realize that it is only necessary to slightly logically programme the method and process and programme the method and process into the integrated circuit using the above hardware description languages, such that the hardware circuit that implements the logic method and process can be very easily obtained.

A controller may be implemented in any suitable manner. For example, the controller may take the form of, e.g., a microprocessor or a processor and a computer-readable medium storing computer-readable program code (such as software or firmware) that can be executed by the (micro) processor, a logic gate, a switch, an disclosure specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. A memory controller may also be implemented as a part of the control logic of a memory. Those skilled in the art also know that, in addition to implementing the controller in the form of pure computer-readable program code, the method and steps can be entirely logically programmed to cause the controller to implement the same function in the form of the logic gate, the switch, the special integrated circuit, the programmable logic controller, the embedded microcontroller, or the like. Therefore, such a controller may be regarded as a hardware component, and an apparatus that is configured to implement various functions and is included therein may also be regarded as a structure within the hardware component. Or even, the apparatus that is configured to implement various functions may be regarded as not only a software module of the implementing method, but also the structure within the hardware component.

The system, apparatus, modules or units illustrated in the above embodiments may be specifically implemented by a computer chip or entity, or by a product having a certain function. A typical implementing device is a computer. Specifically, the computer may be, e.g., a personal computer, a laptop computer, a cellular phone, a camera phone, a smart phone, a personal digital assistant, a media player, a navigation device, an e-mail device, a game console, a tablet computer, a wearable device, or a combination of any device of these devices.

For ease of description, when describing the above apparatus, the functions are divided into various units and described respectively. Of course, when implementing the present disclosure, the functions of each unit may be implemented in a given piece or more pieces of software and/or hardware.

As will be appreciated by those skilled in the art, the embodiments of the present disclosure may be provided as a method, system, or computer program product. Accordingly, the present disclosure may take the form of an entirely hardware embodiment, an entirely software embodiment, or an embodiment combining software and hardware. Furthermore, the present disclosure may take the form of a computer program product embodied in one or more computer-readable storage mediums (including, but not limited to, a disk memory, a CD-ROM, an optical memory, and the like) having computer-readable program code embodied thereon.

The present disclosure is described with reference to the flowcharts and/or block diagrams of the method, device (system), and computer program product according to the embodiments of the present disclosure. It should be understood that each process and/or block in the flow charts and/or block diagrams as well as combinations of processes and/or blocks in the flow charts and/or block diagrams may be implemented by computer program instructions. The computer program instructions may be provided to a processor of a general purpose computer, a special purpose computer, an embedded processor, or other programmable data processing devices to produce a machine, such that the instructions executed via the processor of the computer or other programmable data processing devices create an apparatus for implementing the functions specified in one or more processes in the flow charts and/or one or more blocks in the block diagrams.

These computer program instructions may also be stored in a computer-readable memory that can direct a computer or other programmable data processing devices to function in a particular manner, such that the instructions stored in the computer-readable memory produce an article of manufacture including an instruction apparatus which implements the functions specified in one or more processes in the flow charts and/or one or more blocks in the block diagrams.

The computer program instructions may also be loaded onto a computer or other programmable data processing devices, to cause a series of operational steps to be performed on the computer or other programmable devices, to produce a computer implemented process, such that the instructions executed on the computer or other programmable devices provide steps for implementing the functions specified in one or more processes in the flow charts and/or one or more blocks in the block diagrams.

In a typical configuration, a computing device includes one or more processors (CPU), an input/output interface, a network interface, and an internal memory.

The internal memory may include forms, such as a volatile memory, a random access memory (RAM), and/or a nonvolatile memory, e.g., a read only memory (ROM) or a flash RAM, in a computer-readable medium. The internal memory is an example of the computer-readable medium.

The computer-readable medium includes permanent/non-permanent media and removable/non-removable media that can achieve information storage by any method or technology. The information may be a computer-readable instruction, a data structure, a program module, or other data. Examples of the computer storage medium include, but are not limited to, a phase-change random access memory (PRAM), a static random access memory (SRAM), a dynamic random access memory (DRAM), a random access memory (RAM) of other type, a read only memory (ROM), an electrically erasable programmable read only memory (EEPROM), a flash RAM or other internal memory technologies, a compact disc read only memory (CD-ROM), a digital versatile disc (DVD) or other optical storage, a magnetic cassette tape, and a magnetic tape or magnetic disk storage or other magnetic storage devices, or any other non-transmission medium, which can be configured to store information that can be accessed by the computing device. As defined herein, the computer-readable medium excludes transitory media, e.g., a modulated data signal or carrier wave.

It should be further noted that the terms such as "comprising", "including" or any other variation thereof are intended to cover non-exclusive inclusions, such that a process, method, article, or device that includes a series of elements not only includes those elements, but also includes other elements that are not explicitly listed, or further includes elements that are inherent to such process, method, article, or device. An element preceded by the wording "comprises a . . . " does not, without more constraints, preclude the existence of additional identical elements in the process, method, article, or deice that includes the element.

As will be appreciated by those skilled in the art, the embodiments of the present disclosure may be provided as a method, system, or computer program product. Accordingly, the embodiments of the present disclosure may take the form of an entirely hardware embodiment, an entirely software embodiment, or an embodiment combining software and hardware. Furthermore, the present disclosure may take the form of a computer program product embodied in one or more computer-readable storage mediums (including, but not limited to, a disk memory, a CD-ROM, an optical memory, and the like) having computer-readable program code embodied thereon.

The present disclosure may be described in the general context of computer-executable instructions, such as program modules, executed by a computer. Generally, the program modules include routines, programs, objects, components, data structures, etc. that perform particular tasks or implement particular abstract data types. The present disclosure may also be practiced in distributed computing environments where tasks are performed by remote processing devices that are linked through a communication network. In a distributed computing environment, the program modules may be located in both local and remote computer storage media including storage devices.

The above is merely embodiments of the present disclosure, and is not intended to limit the present disclosure. For those skilled in the art, the present disclosure may have various modifications and alterations. Any modification, equivalent replacement, improvement, and the like made within the spirit and principles of the present disclosure should be included within the scope of appended claims of the present disclosure.

What is claimed is:

1. A capacitance detection method of a touch display panel, comprising:

receiving a real-time sync signal sent from a display panel, and generating a trigger signal in a period in which a display driving noise is avoided based on the real-time sync signal;

generating a sync driving signal in the period in which the display driving noise is avoided based on the received trigger signal, to drive a driving electrode of the touch display panel;

detecting a signal value of a capacitance sensor in the touch display panel in the period in which the display driving noise is avoided based on the received trigger signal; and gatedly connecting the signal value of the capacitance sensor in the touch display panel to a buffer storing a reference voltage during a period of the display driving noise, the buffer being connected to an input terminal of a differential circuit, the reference voltage being inputted to another input terminal of the differential circuit, an output terminal of the differential circuit being at a zero level.

2. The capacitance detection method of a touch display panel according to claim 1, wherein the receiving a real-time sync signal sent from a display panel, and generating a trigger signal in a period in which a display driving noise is avoided based on the real-time sync signal comprises:

obtaining a correlation between a display noise caused by a display driving operation of the touch display panel and the real-time sync signal; and determining a period of time in which the display noise is avoided in a real-time sync signal cycle based on the correlation, and generating the trigger signal in the period of time.

3. The capacitance detection method of a touch display panel according to claim 2, wherein the correlation comprises the display noise being fixed and centralized with respect to an edge position of a real-time horizontal sync signal.

4. The capacitance detection method of a touch display panel according to claim 1, wherein the real-time sync signal comprises a real-time horizontal sync signal.

5. The capacitance detection method of a touch display panel according to claim 1, wherein the method further comprises: amplifying the detected signal value of the capacitance sensor.

6. The capacitance detection method of a touch display panel according to claim 5, wherein the method further comprises:

filtering out an additional interference signal in the amplified signal value of the capacitance sensor.

7. A capacitance detection circuit of a touch display panel, comprising:

a sync signal controller configured to receive a real-time sync signal sent from a display panel, and generate a trigger signal in a period in which a display driving noise is avoided based on the real-time sync signal;

a driving signal generator configured to generate a sync driving signal in the period in which the display driving noise is avoided based on the received trigger signal, to drive a driving electrode of the touch display panel;

a signal detection gate configured to detect a signal value of a capacitance sensor in the touch display panel in the period in which the display driving noise is avoided based on the received trigger signal; and a buffer storing a reference voltage and a differential circuit, wherein the signal detection gate is configured to gatedly connect the signal value of the capacitance sensor in the touch display panel to the buffer storing the reference voltage during a period of the display driving noise, the buffer is connected to an input terminal of the differential circuit, the reference voltage is inputted to another input terminal of the differential circuit, and an output terminal of the differential circuit is at a zero level.

8. The capacitance detection circuit of a touch display panel according to claim 7, wherein the sync signal controller comprises:

a correlation obtaining unit configured to obtain a correlation between a display noise caused by a display driving operation of the touch display panel and the real-time sync signal; and a signal generating unit configured to determine a period of time in which the display noise is avoided in a real-time sync signal cycle based on the correlation, and generate the trigger signal in the period of time.

9. The capacitance detection circuit of a touch display panel according to claim 8, wherein the correlation comprises the display noise being fixed and centralized with respect to an edge position of a real-time horizontal sync signal.

10. The capacitance detection circuit of a touch display panel according to claim 7, wherein the real-time sync signal comprises a real-time horizontal sync signal.

11. The capacitance detection circuit of a touch display panel according to claim 7, wherein the circuit further comprises:

an amplifier configured to amplify the detected signal value of the capacitance sensor.

12. The capacitance detection circuit of a touch display panel according to claim 11, wherein the circuit further comprises:

a low-pass anti-aliasing filter configured to filter out an additional interference signal in the amplified signal value of the capacitance sensor.

13. An electronic device, comprising the capacitance detection circuit according to claim 7.

14. A touch integrated chip comprising a capacitance detection circuit, wherein the capacitance detection circuit comprises:

a sync signal controller configured to receive a real-time sync signal sent from a display panel, and generate a trigger signal in a period in which a display driving noise is avoided based on the real-time sync signal;

a driving signal generator configured to generate a sync driving signal in the period in which the display driving noise is avoided based on the received trigger signal, to drive a driving electrode of the touch display panel;

a signal detection gate configured to detect a signal value of a capacitance sensor in the touch display panel in the period in which the display driving noise is avoided based on the received trigger signal; and a buffer storing a reference voltage and a differential circuit, wherein the signal detection gate is configured to gatedly connect the signal value of the capacitance sensor in the touch display panel to the buffer storing the reference voltage during a period of the display driving noise, the buffer is connected to an input terminal of the differential circuit, the reference voltage is inputted to another input terminal of the differential circuit, and an output terminal of the differential circuit is at a zero level.

15. The touch integrated chip according to claim 14, wherein the sync signal controller comprises:

a correlation obtaining unit configured to obtain a correlation between a display noise caused by a display driving operation of the touch display panel and the real-time sync signal; and a signal generating unit configured to determine a period of time in which the display noise is avoided in a real-time sync signal cycle based on the correlation, and generate the trigger signal in the period of time.

16. The touch integrated chip according to claim 15, wherein the correlation comprises the display noise being fixed and centralized with respect to an edge position of a real-time horizontal sync signal.

17. The touch integrated chip according to claim 14, wherein the circuit further comprises:
- an amplifier configured to amplify the detected signal value of the capacitance sensor, and
- a low-pass anti-aliasing filter configured to filter out an additional interference signal in the amplified signal value of the capacitance sensor.

* * * * *